United States Patent [19]
Rabell

[11] Patent Number: 5,782,224
[45] Date of Patent: Jul. 21, 1998

[54] GRILL WITH ROTATING RACK

[76] Inventor: Robert L. Rabell, 10560 E. Washington St., Albion, Pa. 16401

[21] Appl. No.: 816,744

[22] Filed: Feb. 6, 1997

[51] Int. Cl.[6] .................. A47J 37/00; F24B 3/00
[52] U.S. Cl. .................. 126/25 R; 126/9 R; 99/395; 99/397; 99/421 H
[58] Field of Search .................. 126/25 R, 9 R, 126/25 AA, 41 R, 41 A, 41 B; 99/395, 397, 398, 409, 421 H

[56] References Cited

U.S. PATENT DOCUMENTS

| | | | |
|---|---|---|---|
| D. 325,317 | 4/1992 | Nuth | D7/334 |
| 3,599,624 | 8/1971 | Gehring | 126/25 R |
| 3,699,876 | 10/1972 | Ellis | 99/259 |
| 4,162,650 | 7/1979 | Davis et al. | 99/419 |
| 4,944,282 | 7/1990 | Aguiar et al. | 126/25 AA |
| 5,293,859 | 3/1994 | Lisker | 126/25 A |
| 5,404,795 | 4/1995 | Coble | 99/339 |

*Primary Examiner*—James C. Yeung
*Attorney, Agent, or Firm*—David L. Volk

[57] ABSTRACT

A first rack is connectable to a second rack to form a rack assembly adapted to hold food between the first rack and the second rack. A base is adapted to provide a source of heat to food placed between the first rack and the second rack. The base includes a fulcrum about which the rack assembly is able to pivot from a first position wherein the first rack is above the second rack to a second position wherein the second rack is above the first rack.

3 Claims, 4 Drawing Sheets

GRILL WITH ROTATING RACK

BACKGROUND OF THE INVENTION

1. Field of the Invention

The present invention relates to devices for cooking food, particularly to a grill with a rotating rack assembly.

2. Description of the Related Art

When cooking food on a grille, the food must be frequently turned over to ensure even cooking. This can be a particular problem when cooking for a large group of people, such as at picnics for civic organizations or other groups, and at carnivals and fairs where food is prepared for the public. In such a situation, dozens of pieces of food on a grill at a single time must be individually turned over.

Motorized rotating barbeque spits are well known devices for overcoming this problem, automatically rotating the food to ensure even cooking. These spits have the disadvantage of requiring the food to be inserted on the spit and often tied with string. These spits also add to the cost of the cooking equipment, particularly when a large volume cooking capacity is required.

What is needed is a device which permits all of the food on a grill to be turned over together instead of individually, thereby saving time for the cook and permitting the cook to direct his or attention to other matters.

SUMMARY OF THE INVENTION

The apparatus for cooking food of the present invention includes a first rack and a second rack. The first rack is removably connectable to the second rack to form a rack assembly adapted to hold food between the first rack and the second rack. A base is adapted to provide a source of heat to food placed between the first rack and the second rack. The base includes a fulcrum about which the rack assembly is able to pivot from a first position wherein the first rack is above the second rack to a second position wherein the second rack is above the first rack. The rack assembly includes a handle to allow manual pivoting of the rack assembly. The base is configured to maintain the rack assembly in a fully supported manner when the rack assembly is in the first position and when the rack assembly is in the second position.

Because the first rack and the second rack are removably connectable to each other, the rack assembly can be separated for cleaning.

Because the base includes a fulcrum about which the rack assembly is able to pivot, food may be cooked evenly on two sides.

Because the rack assembly is adapted to hold food between the first rack and the second rack, many items of food can be easily cooked at one time, without having to turn over the pieces individually.

Still further features and benefits will become apparent from the ensuing description and drawings.

DETAILED DESCRIPTION

Figure 1:
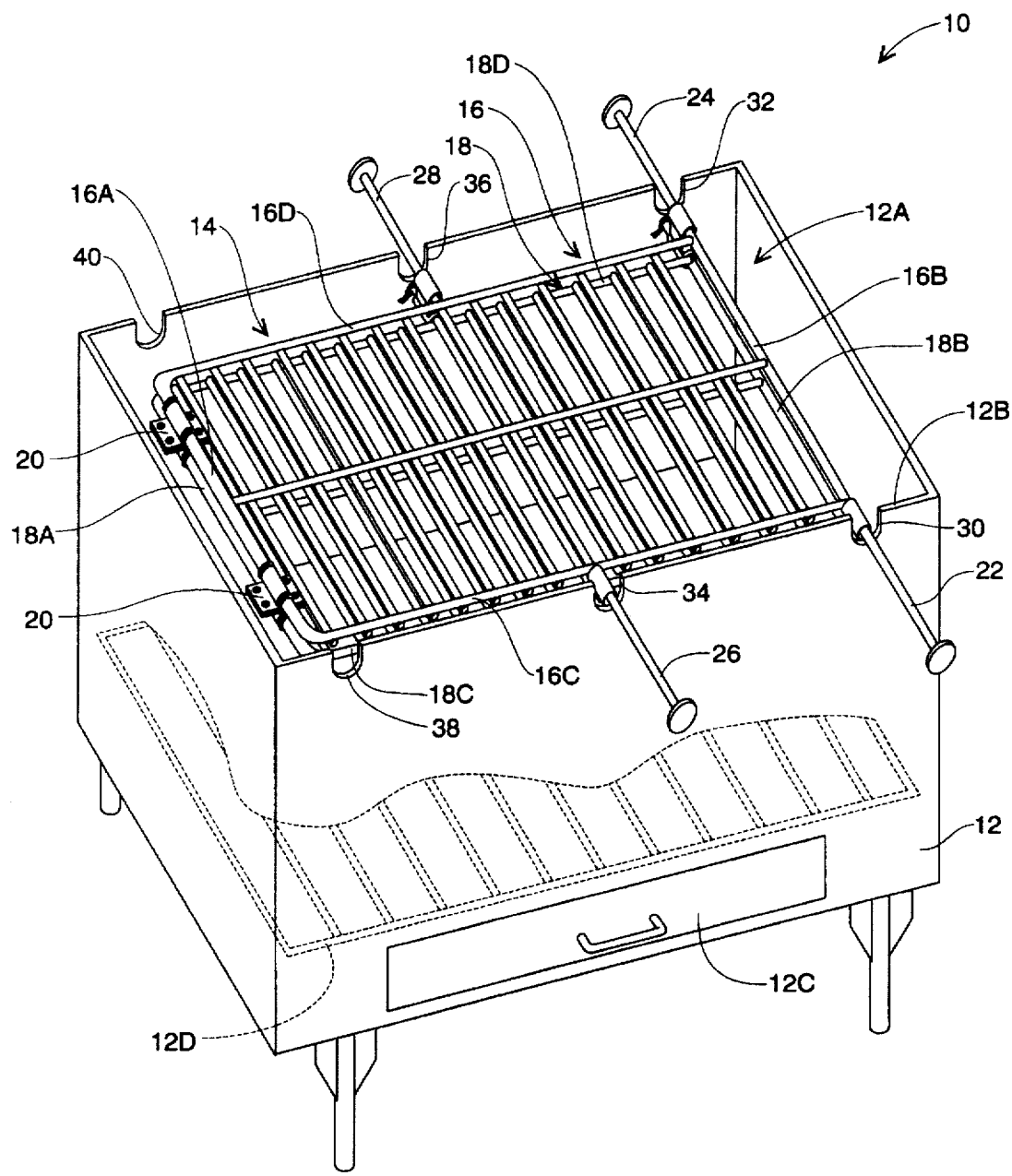
FIG. 1 is a perspective view of a grill including a base and a rack assembly.
Figure 2:
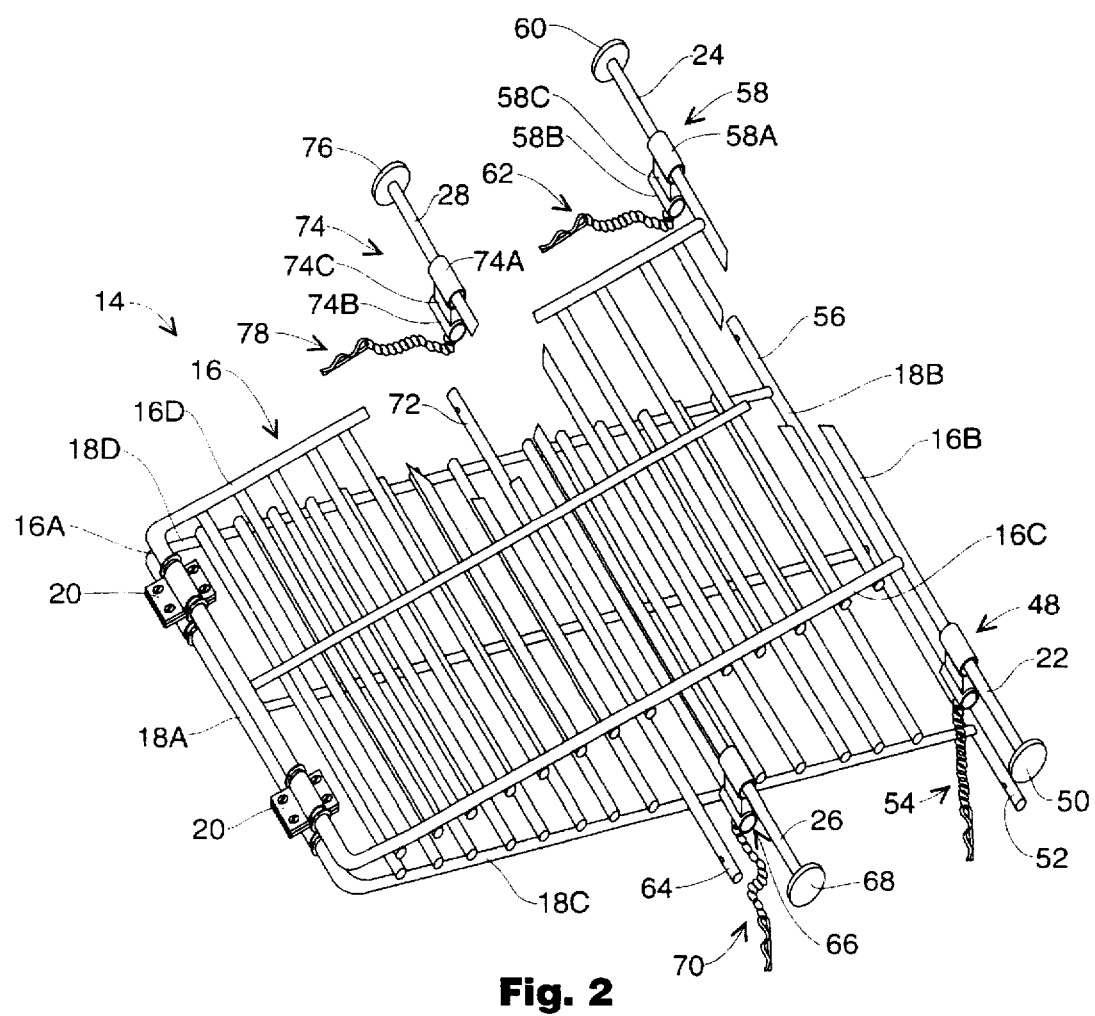
FIG. 2 is a perspective view of the rack assembly shown in a partially open condition.

FIG. 1 is a perspective view of a grill 10 including a base 12 and a rack assembly 14. FIG. 2 is a perspective view of the rack assembly 14 shown in a partially open condition, with portions of the rack assembly 14 broken away to reveal important structure. Referring to FIGS. 1 and 2, the rack assembly 14 comprises a first rack 16 and a second rack 18.

The first rack 16 comprises a first rack first end 16A opposite a first rack second end 16B, and a first rack first side 16C opposite a first rack second side 16D. The second rack 18 comprises a second rack first end 18A opposite a second rack second end 18B, and a second rack first side 18C opposite a second rack second side 18D. Two hinge assemblies 20 hingedly connect the first rack first end 16A to the second rack first end 18A.

A first handle 22 extends outwardly from the first rack first side 16C at the first rack second end 16B, and a second handle 24 extends outwardly from the first rack second side 16D at the first rack second end 16B.

A first pivot arm 26 extends outwardly from the first rack first side 16C and is positioned between the first rack first end 16A and the first rack second end 16B. A second pivot arm 28 extends outwardly from the first rack second side 16D and is disposed opposite the first pivot arm 26.

In FIG. 1, the first rack 16 and the second rack 18 are connected together at the first and second handles 22, 24 and at the first and second pivot arms 26, 28. Details of these connections will be described later herein.

The base 12 includes a top opening 12A bounded by a rim 12B. The rim 12B includes structure forming a first pivot arm support 30 disposed opposite a second pivot arm support 32, a first handle support 34 disposed opposite a second handle support 36, and an alternate first handle support 38 disposed opposite an alternate second handle support 40. The first handle support 34 and the alternate first handle support 38 are disposed on opposite sides of the first pivot arm support 30. The second handle support 36 and the alternate second handle support 40 are disposed on opposite sides of the second pivot arm support 32.

To use the invention, a person (not shown) opens the rack assembly 14 and places food (not shown) to be cooked on the second rack 18, then closes the rack assembly 14 with the food captured between the first rack 16 and the second rack 18. The first and second handles 22, 24 are initially resting in the first and second handle supports 34, 36. To turn all of the food over at once to ensure even cooking, the person lifts either the first handle 22 or the second handle 24 to pivot the rack assembly :t4 about the first and second pivot arms 26, 28, permitting the first and second handles 22, 24 to come to rest within the alternate first and alternate second handle supports 38, 40.

The base 12 provides heat for cooking the food (not shown) within the rack assembly 14. Although many configurations of the base 12 are possible and within the scope of the present invention, the base 12 is shown with a cleanout door 12C positioned beneath a fuel rack 12D which may hold wood or charcoal (not shown). The ashes (not shown) fall through the fuel rack 12D, and may be accessed for cleaning by opening the cleanout door 12C.

Figure 3:
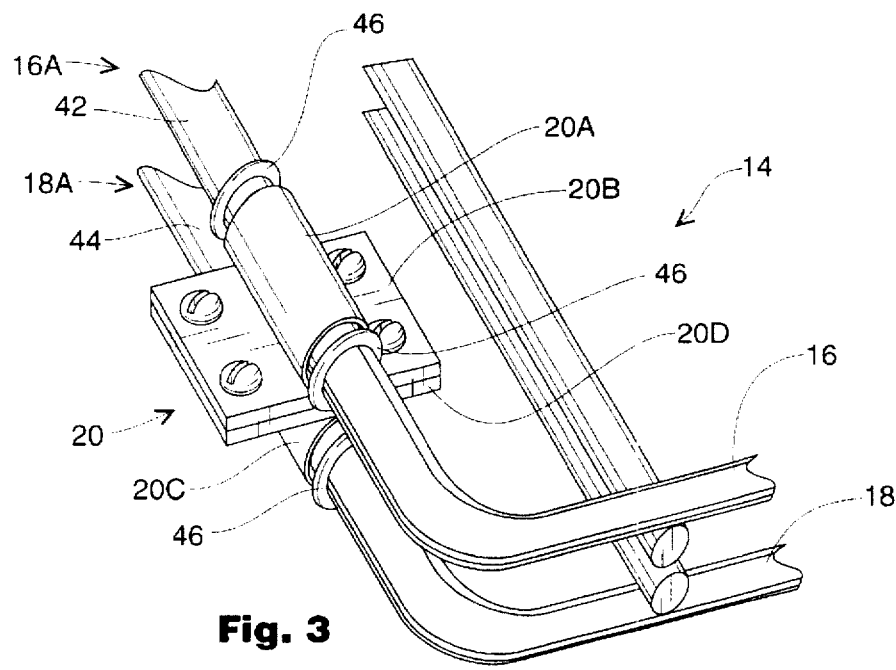
FIG. 3 is a partial perspective view of a hinged connection between a first rack and a second rack of the rack assembly.

FIG. 3 is a partial perspective view of one of the hinge assemblies 20 which provide a hinged connection between the first rack 16 and the second rack 18 of the rack assembly 14. Referring to FIGS. 2 and 3, the hinge assembly 20 comprises a first hinge sleeve 20A connected along its side to a first plate 20B. A second hinge sleeve 20C is connected along its side to a second plate 20D. The first plate 20B is removably bolted to the second plate 20D. A first tubular member 42 at the first rack first end 16A is inserted through the first hinge sleeve 20A. A second tubular member 14 at the second rack first end 18A is inserted through the second hinge sleeve 20C. Stop members 46 located on the first and second tubular members 42, 44 at each end of the first and second hinge sleeves 20A, 20C restrain the first and second hinge sleeves 20A, 20C from sliding along the first and second tubular members 42, 44 past the stop members 46.

Figure 4:
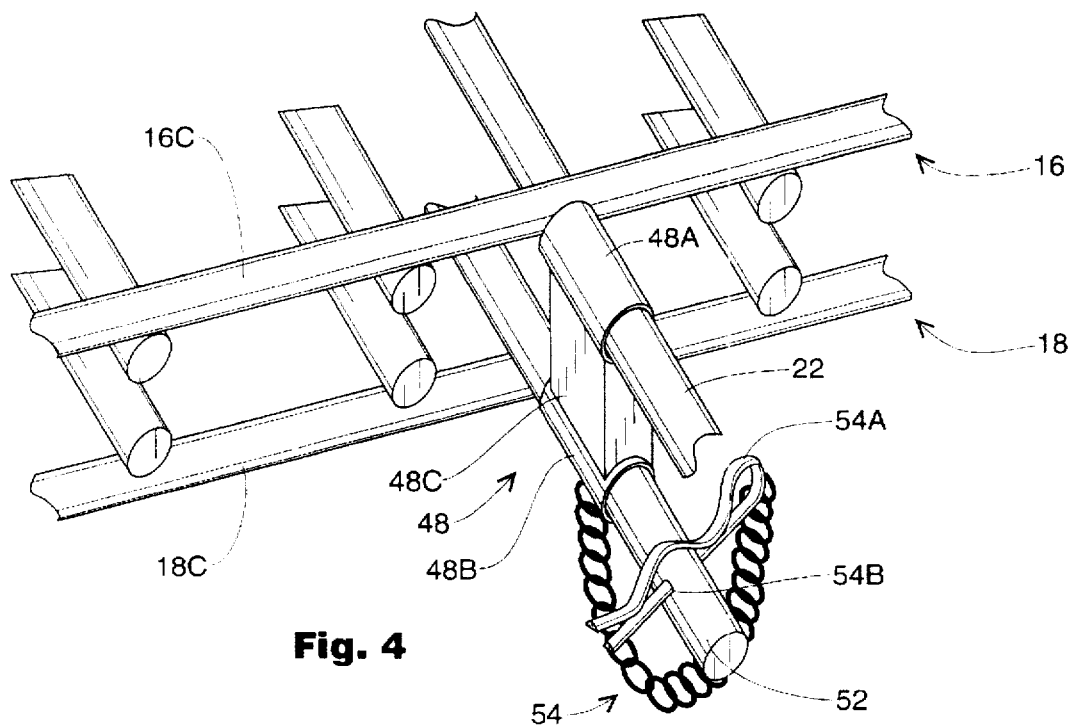
FIG. 4 is a partial perspective view of a connection between the first rack and the second rack at the first handle.

FIG. 4 is a partial perspective view of a connection between the first rack 16 and the second rack 18 at the first handle 22. Referring to FIGS. 2 and 4, a first retaining member 48 comprises a first sleeve 48A and a second sleeve 48B disposed parallel to and opposite each other with a first spacing member 48C disposed between them. The first sleeve 48A is slidably retained on the first handle 22. A first handle stop 50 having a diameter greater than an outside diameter of the first sleeve 48A keeps the first sleeve 48A from sliding off of the first handle 22. A first extension 52 extends outwardly from the second rack first side 18C opposite the first handle 22. The second sleeve 48B is configured to be slidably positionable on the first extension 52. A second sleeve retaining means 54 such as a cotter pin 54A attached to the second sleeve 48B in combination with a cotter pin receiving aperture 54B is used to retain the second sleeve 48B on the first extension 52. To connect the first rack 16 to the second rack 18 at the first handle 22, a person simpler slides the second sleeve 48B over the first extension 52 and inserts the cotter pin 54A into the cotter pin receiving aperture 54B.

Referring to FIG. 2, a second extension 56 extends outwardly from the second rack second side 18D opposite the second handle 24. A second retaining member 58 including a third sleeve 58A, a fourth sleeve 58B, and a second spacing member 58C, a second handle stop 60, and a fourth sleeve retaining means 62 are each configured and used similarly to the corresponding components in FIG. 4.

Figure 5:
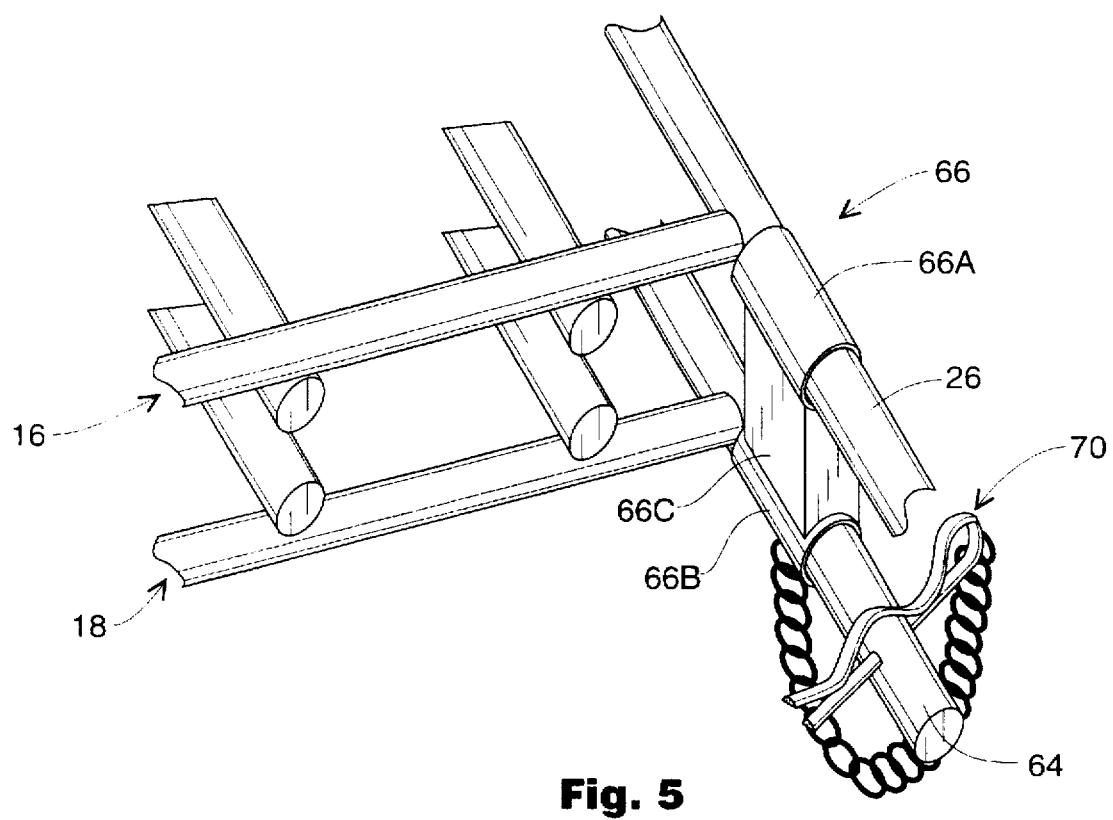
FIG. 5 is a partial perspective view of a connection between the first rack and the second rack at the first pivot arm.

FIG. 5 is a partial perspective view of a connection between the first rack 16 and the second rack 18 at the first pivot arm 26. Referring to FIGS. 2 and 5, a third extension 64 extends outwardly from the second rack first side 18C opposite the first pivot arm 26. A third retaining member 66 including a fifth sleeve 66A, a sixth sleeve 66B, and a third spacing member 66C, a first pivot arm stop 68, and a sixth sleeve retaining means 70 are each configured and used similarly to the corresponding components in FIG. 4.

Referring to FIG. 2, a fourth extension 72 extends outwardly from the second rack second side 18D opposite the second pivot arm 28. A fourth retaining member 74 including a seventh sleeve 74A, an eighth sleeve 74B, and a fourth spacing member 74C, a second pivot arm stop 76, and an eighth sleeve retaining means 78 are each configured and used similarly to the corresponding components in FIG. 4.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:
1. An apparatus for cooking food comprising:
a first rack and a second rack;
the first rack having a first rack first end opposite a first rack second end, and a first rack first side opposite a first rack second side;
the second rack having a second rack first end opposite a second rack second end, and a second rack first side opposite a second rack second side;
the first rack first end hingedly connected to the second rack first end to form a rack assembly adapted to hold food between the first rack and the second rack;
a first handle extending outwardly from the first rack first side at the first rack second end;
a second handle extending outwardly from the first rack second side at the first rack second end;
a first extension extending outwardly from the second rack first side opposite the first handle;
a first retaining member comprising a first sleeve and a second sleeve disposed parallel to each other;
the first handle having the first sleeve slidably retained thereon;
the second sleeve configured to be slidably positionable on the first extension;
a selectively engageable second sleeve retaining means for retaining the second sleeve on the first extension;
a second extension extending outwardly from the second rack second side opposite the second handle;
a second retaining member comprising a third sleeve and a fourth sleeve disposed parallel to each other;
the second handle having the third sleeve slidably retained thereon;
the fourth sleeve configured to be slidably positionable on the second extension;
a selectively engageable fourth sleeve retaining means for retaining the fourth sleeve on the second extension;
a first pivot arm extending outwardly from the rack assembly;
a second pivot arm extending outwardly from the rack assembly and disposed opposite the first pivot arm;
a base adapted to provide a source of heat to food placed between the first rack and the second rack;
the base having a top opening bounded by a rim;
the rim including structure forming a first pivot arm support, a first handle support, and an alternate first handle support, the first handle support and the alternate first handle support located on opposite sides of the first pivot arm support;
the rim including structure forming a second pivot arm support, a second handle support, and an alternate second handle support, the second handle support and the alternate second handle support located on opposite sides of the second pivot arm support;
the first and second pivot arm supports, the first and second handle supports, and the alternate first and alternate second handle supports configured and positioned to permit the rack assembly to be pivoted about the first and second pivot arms from a first position wherein the rack assembly is substantially horizontal, the first rack is above the second rack, and the first and second handles are supported respectively by the first and second handle supports, to a second position wherein the rack assembly is substantially horizontal, the second rack is above the first rack, and the first and second handles are supported respectively by the alternate first and alternate second handle supports.

2. An apparatus for cooking food comprising:

a first rack and a second rack;

the first rack having a first rack first end opposite a first rack second end, and a first rack first side opposite a first rack second side;

the second rack having a second rack first end opposite a second rack second end, and a second rack first side opposite a second rack second side;

the first rack first end hingedly connected to the second rack first end to form a rack assembly adapted to hold food between the first rack and the second rack;

a first handle extending outwardly from the first rack first side at the first rack second end;

a second handle extending outwardly from the first rack second side at the first rack second end;

a first extension extending outwardly from the second rack first side opposite the first handle;

a first retaining member comprising a first sleeve and a second sleeve disposed parallel to and opposite each other with a first spacing member disposed between the first and second sleeves;

the first handle having the first sleeve slidably retained thereon;

the second sleeve configured to be slidably positionable on the first extension;

a selectively engageable second sleeve retaining means for retaining the second sleeve on the first extension;

a second extension extending outwardly from the second rack second side opposite the second handle;

a second retaining member comprising a third sleeve and a fourth sleeve disposed parallel to and opposite each other with a second spacing member disposed between the third and fourth sleeves;

the second handle having the third sleeve slidably retained thereon;

the fourth sleeve configured to be slidably positionable on the second extension;

a selectively engageable fourth sleeve retaining means for retaining the fourth sleeve on the second extension;

a first pivot arm extending outwardly from the first rack first side and positioned between the first rack first end and the first rack second end;

a second pivot arm extending outwardly from the first rack second side and disposed opposite the first pivot arm;

a base adapted to provide a source of heat to food placed between the first rack and the second rack;

the base having a top opening bounded by a rim;

the rim including structure forming a first pivot arm support, a first handle support, and an alternate first handle support, the first handle support and the alternate first handle support located on opposite sides of the first pivot arm support;

the rim including structure forming a second pivot arm support, a second handle support, and an alternate second handle support, the second handle support and the alternate second handle support located on opposite sides of the second pivot arm support;

the first and second pivot arm supports, the first and second handle supports, and the alternate first and alternate second handle supports configured and positioned to permit the rack assembly to be pivoted about the first and second pivot arms from a first position wherein the rack assembly is substantially horizontal, the first rack is above the second rack, and the first and second handles are supported respectively by the first and second handle supports, to a second position wherein the rack assembly is substantially horizontal, the second rack is above the first rack, and the first and second handles are supported respectively by the alternate first and alternate second handle supports.

3. The apparatus of claim 2, further comprising a connection means for removably connecting the first rack to the second rack at the first and second pivot arms.

* * * * *